US008657062B2

(12) United States Patent
Tashiro

(10) Patent No.: US 8,657,062 B2
(45) Date of Patent: Feb. 25, 2014

(54) STEERING SYSTEM

(71) Applicant: JTEKT Corporation, Osaka (JP)

(72) Inventor: Takashi Tashiro, Kashihara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/721,600

(22) Filed: Dec. 20, 2012

(65) Prior Publication Data

US 2013/0161116 A1 Jun. 27, 2013

(30) Foreign Application Priority Data

Dec. 26, 2011 (JP) ................... 2011-283515

(51) Int. Cl.
*B62D 5/04* (2006.01)

(52) U.S. Cl.
USPC ............................ 180/446; 180/443; 180/444

(58) Field of Classification Search
USPC .......................................................... 180/446
See application file for complete search history.

(56) References Cited

U.S. PATENT DOCUMENTS

| 4,437,531 | A | * | 3/1984 | Urabe ............................ 180/446 |
| 5,803,202 | A | * | 9/1998 | Bohner et al. ................. 180/443 |
| 8,066,092 | B2 | * | 11/2011 | Shimizu et al. ............... 180/444 |
| 2003/0146038 | A1 | | 8/2003 | Mills et al. | |

FOREIGN PATENT DOCUMENTS

| EP | 2 275 323 A1 | 1/2011 |
| JP | A-10-278826 | 10/1998 |
| JP | A-2001-114123 | 4/2001 |

OTHER PUBLICATIONS

Extended European Search Report issued in European Patent Application No. 12198841.4 dated Apr. 10, 2013.

* cited by examiner

*Primary Examiner* — J. Allen Shriver, II
*Assistant Examiner* — Conan Duda
(74) *Attorney, Agent, or Firm* — Oliff PLC

(57) ABSTRACT

In a steering system, an operation mechanism that includes an operation member includes: a steering angle sensor that detects a steering angle of the operation member; and a steering direction detection unit that detects a steering direction of the operation member. The steering direction detection unit includes: a threaded shaft that is rotatable in the steering direction of the operation member; a nut that is screwed to the threaded shaft; a nut guide that causes the nut to move in accordance with rotation of the threaded shaft; a stopper that prevents movement of the nut beyond a predetermined position; a proximity detection sensor that detects a fact that the nut is in proximity to the stopper; and a variable axial length mechanism that reduces a clearance between the nut and the stopper in response to occurrence of a malfunction in the steering angle sensor.

3 Claims, 5 Drawing Sheets

STEERING SYSTEM

INCORPORATION BY REFERENCE

The disclosure of Japanese Patent Application No. 2011-283515 filed on Dec. 26, 2011 including the specification, drawings and abstract, is incorporated herein by reference in its entirety.

BACKGROUND OF THE INVENTION

1. Field of the Invention

The invention relates to a steer-by-wire steering system.

2. Description of Related Art

In a vehicle steering system that is described in Japanese Patent Application Publication No. 2001-114123 (JP 2001-114123 A) as a steer-by-wire steering system, a rotating operation member and wheels are not mechanically coupled to each other. A steering actuator, which is controlled on the basis of a rotating operation amount of the rotating operation member, steers the wheels. In the above-described steer-by-wire steering system, a configuration for detecting the rotation of the rotating operation member is important. When a malfunction occurs in the above-described configuration, steering is disabled even if the steering actuator is properly operable. In the configuration for detecting the rotation of the rotating operation member, which is described in JP 2001-114123 A, only one angle sensor is provided. In a steering system described in Japanese Patent Application Publication No. 10-278826 (JP 10-278826 A), in order to increase the redundancy of the above-described configuration, a main steering angle sensor and a backup steering angle sensor are provided. Therefore, with the steering system described in JP 10-278826 A, even if a malfunction occurs in the main steering angle sensor, it is possible to continue steering with the use of the backup steering angle sensor.

In the steering system described in JP 10-278826 A, the two identical steering angle sensors are provided in order to make it possible to continue steering even if a malfunction occurs in one of the steering angle sensors. As a result, the number of components and the cost are unnecessarily increased.

SUMMARY OF THE INVENTION

It is an object of the invention to provide a steer-by-wire steering system with a configuration that allows continuation of steering even in the event of a malfunction in a steering angle sensor, and that is implemented without increases in the number of components and the cost.

An aspect of the invention relates to a steering system, including: an operation mechanism that includes an operation member used to perform a steering operation; and a steered mechanism that is not mechanically coupled to the operation mechanism, and that steers a wheel based on the steering operation of the operation member, The operation mechanism includes a steering angle sensor that detects a steering angle of the operation member and a steering direction detection unit that detects a steering direction of the operation member. The steering direction detection unit includes: a threaded shaft that is rotatable in the steering direction of the operation member; a nut that is screwed to the threaded shaft; a nut guide that is arranged parallel to the threaded shaft and that causes the nut to move in an axial direction of the threaded shaft in accordance with rotation of the threaded shaft; a stopper that is provided at at least one end of the nut guide in a longitudinal direction of the nut guide, and that prevents movement of the nut in the axial direction beyond a predetermined position; a proximity detection unit that detects a fact that the nut is in proximity to the stopper, the proximity detection unit being provided at the stopper; and a variable axial length mechanism that reduces a clearance in the axial direction between the nut and the stopper in response to occurrence of a malfunction in the steering angle sensor.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
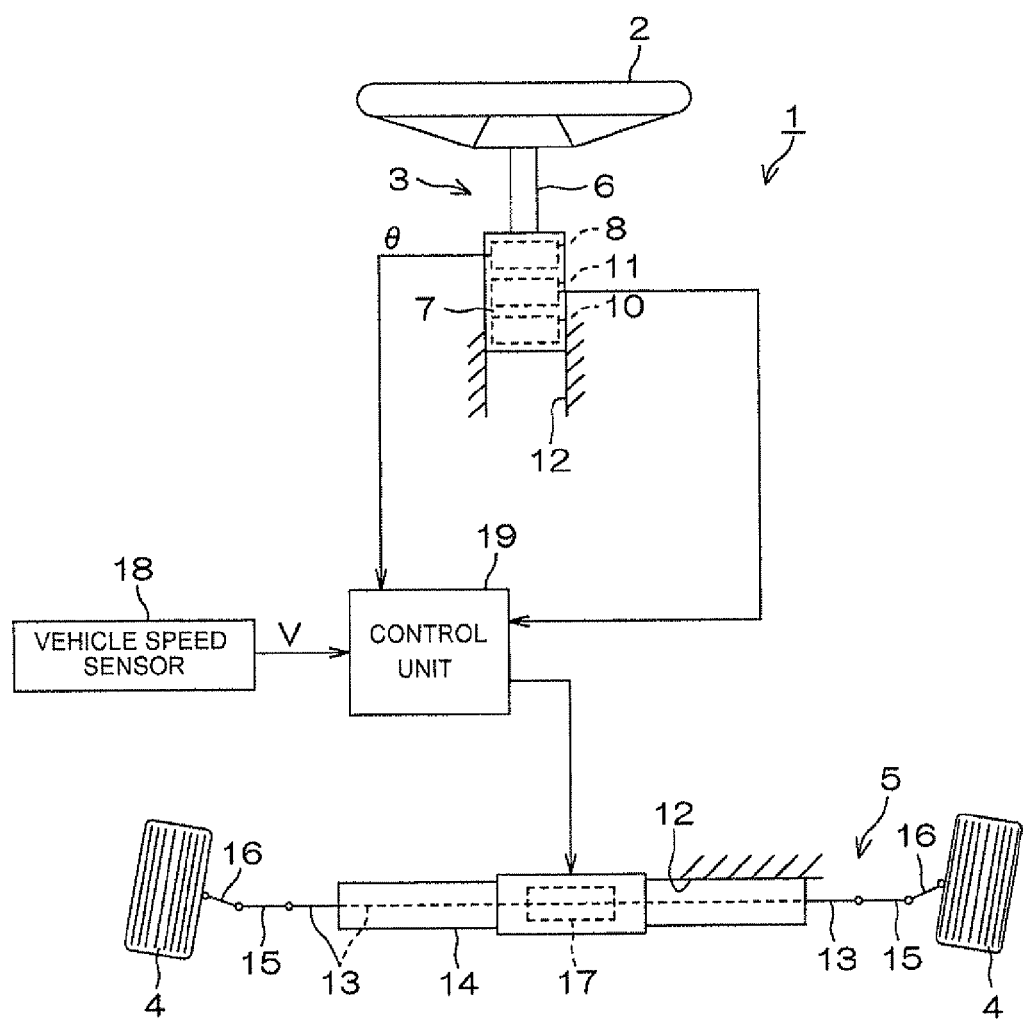
FIG. 1 is a schematic view that shows the schematic configuration of a steering system according to an embodiment of the invention.

An embodiment of the invention will be described with reference to the accompanying drawings. FIG. 1 is a schematic view that shows the schematic configuration of a steering system 1 according to an embodiment of the invention. As shown in FIG. 1, the steering system 1 is applied to a vehicle. The steering system 1 includes an operation mechanism 3 and a steered mechanism 5. The operation mechanism 3 includes a rotatable operation member 2, such as a steering wheel. The steered mechanism 5 steers wheels 4 in response to a steering operation of the operation member 2. The steering system 1 is a so-called steer-by-wire steering system, and the operation mechanism 3 and the steered mechanism 5 are not mechanically coupled to each other.

The operation mechanism 3 mainly includes a rotary shaft 6, a housing 7, a steering angle sensor 8, a reaction force generation unit 10, and a steering direction detection unit 11, in addition to the operation member 2. The rotary shaft 6 extends from the rotation center of the operation member 2. The rotary shaft 6 is rotatably supported by the housing 7. The steering direction detection unit 11 is an example of a steering direction detection unit. The rotary shaft 6 is fixed to the operation member 2.

Thus, the operation member 2 and the rotary shaft 6 are rotatable together with each other about the central axis of the rotary shaft 6. Therefore, the angle by which the operation member 2 is rotated (which is referred to as "steering angle") is equal to the rotation angle of the rotary shaft 6.

The housing 7 is a hollow cylindrical member that is fixed to a vehicle body 12, and part of the rotary shaft 6 (part on the opposite side of the rotary shaft 6 from the operation member 2) is accommodated in a hollow portion of the housing 7. The steering angle sensor 8 is, for example, a resolver, a rotary encoder, or the like, and detects the rotation angle of the rotary shaft 6 (i.e., the steering angle θ of the operation member 2). In this specification, the rotation angle (steering angle) is a vector that includes a rotation amount of the rotary shaft 6 and operation member 2 (an operation amount of the operation member 2) and a rotation direction of the rotary shaft 6 and operation member 2 (a steering direction of the operation member 2). The steering angle sensor 8 is accommodated in the housing 7.

The reaction force generation unit 10 applies resistance to the rotation of the rotary shaft 6 by rubbing against the rotary shaft 6. The resistance is applied to the operation member 2 as a steering reaction force. The steering reaction force applied to the operation member 2A allows a user who operates the operation member 2 to simulatively experience reaction force that the wheels 4 receive from a road surface. The reaction force generation unit 10 is accommodated in the housing 7. The steering direction detection unit 11 is used to detect the steering direction of the operation member 2, and will be described in detail later.

The steered mechanism 5 mainly includes a steered shaft 13, a housing 14, tie rods 15, knuckle arms 16 and a steered system actuator 17. The steered shaft 13 is a shaft member that extends in the width direction (vehicle width direction, and lateral direction in FIG. 1) of the vehicle body 12. The housing 14 is a hollow member that extends in the vehicle width direction, and the steered shaft 13 is passed through a hollow portion of the housing 14. In this state, both end portions of the steered shaft 13 in the axial direction (which coincides with the vehicle width direction) are exposed on the outside of the housing 14. The steered shaft 13 is slidable in the vehicle width direction.

Each of the tie rods 15 is coupled to a corresponding one of the axial end portions of the steered shaft 13. Each of the knuckle arms 16 is coupled to an end portion of a corresponding one of the tie rods 15 at a portion on the opposite side of the tie rod 15 from a portion coupled to the steered shaft 13. The wheels 4 are coupled to the respective knuckle arms 16. The steered system actuator 17 includes, for example, an electric motor (not shown) and a ball screw device (not shown). The ball screw device converts the driving force of the electric motor (the rotational force of an output shaft of the electric motor) into an axial sliding motion of the steered shaft 13. When the electric motor (not shown) of the steered system actuator 17 generates driving force, the steered shaft 13 slides in the vehicle width direction. The sliding motion is transmitted to the tie rods 15 at respective axial end portions of the steered shaft 13. As a result, the knuckle arms 16 pivot, and the wheels 4 are steered.

Although FIG. 1 shows a state where the wheels 4 are steered slightly to the right, the position (position in the rotation direction) of the operation member 2, which corresponds to the position of the wheels 4 at the time when the vehicle is travelling straight ahead, is the steering neutral position. The steering system 1 further includes a vehicle speed sensor 18 and a control unit 19. The vehicle speed sensor 18 detects a vehicle speed V. Detection signals from the steering angle sensor 8, the steering direction detection unit 11 and the vehicle speed sensor 18 are input into the control unit 19. The control unit 19 is also called an electronic control unit (ECU), and is formed of a microcomputer.

Figure 2:
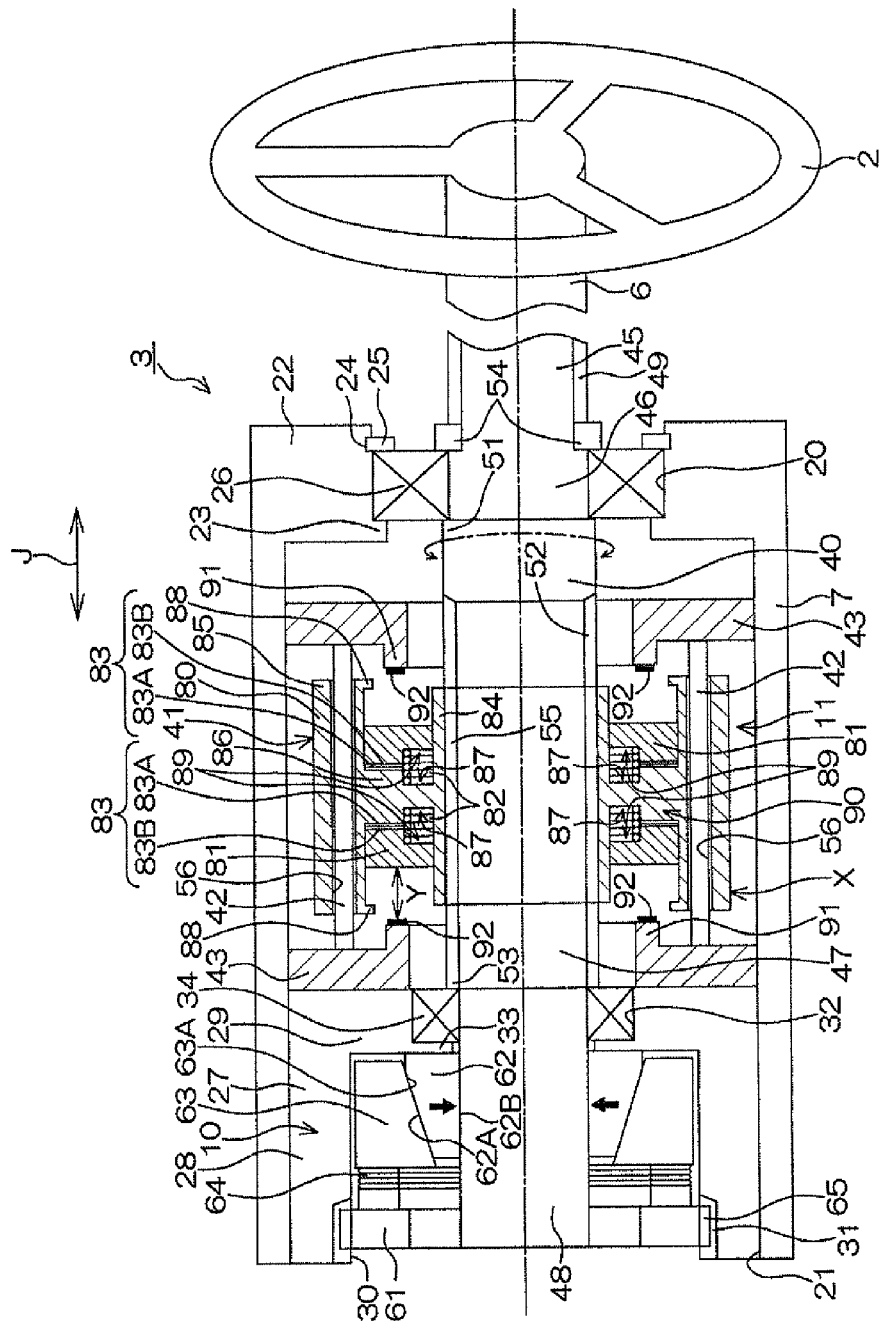
FIG. 2 is a schematic sectional view that shows an operation mechanism that is extracted from the steering system, and that shows a state where auxiliary portions of a variable axial length mechanism provided in a nut are placed in restraint positions.
Figure 3:
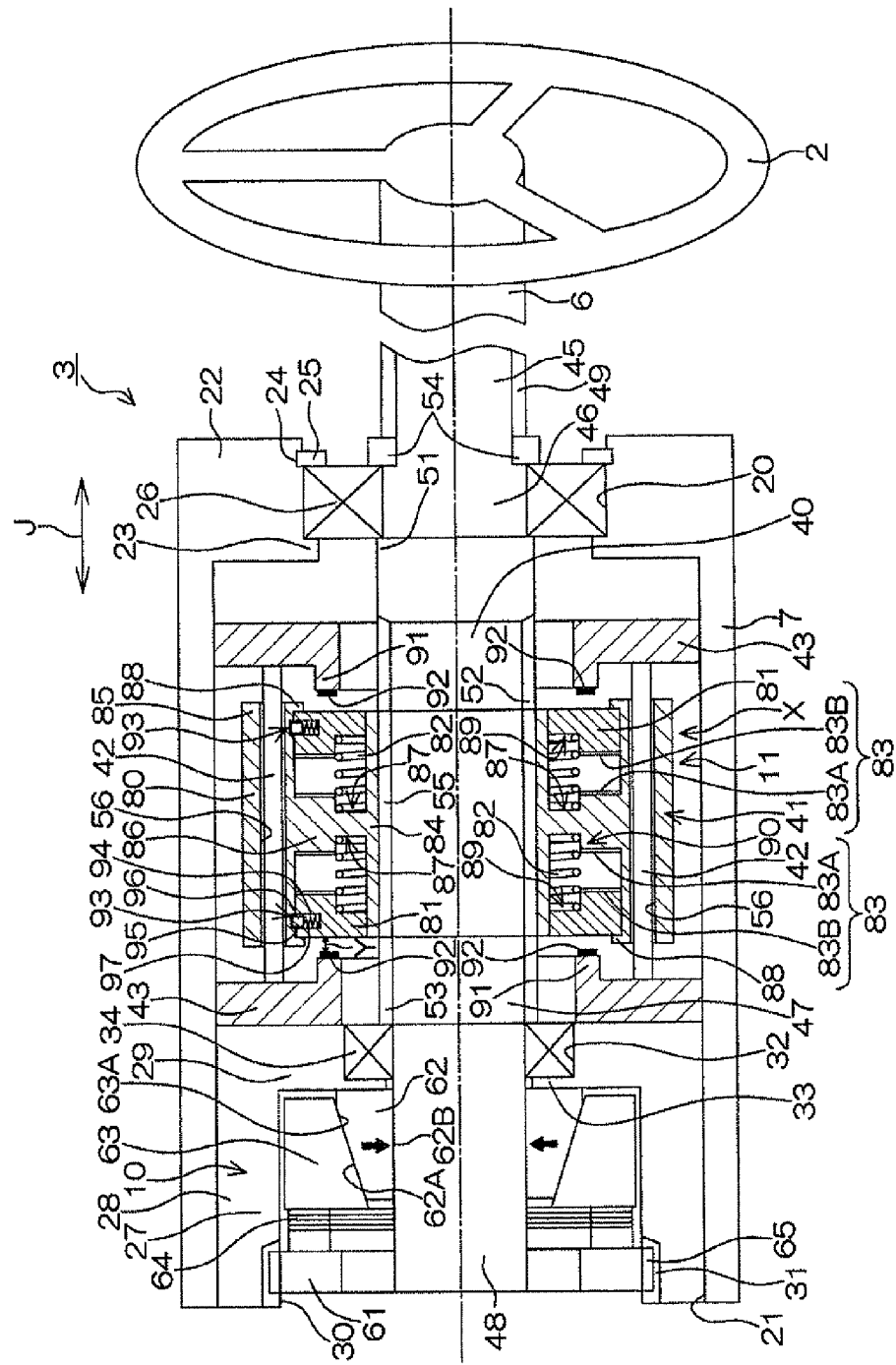
FIG. 3 shows a state where the auxiliary portions in FIG. 2 are placed in released positions.

When the vehicle normally starts moving or is normally travelling, the control unit 19 sets a target steered angle on the basis of the steering angle θ detected by the steering angle sensor 8 and the vehicle speed V detected by the vehicle speed sensor 18. The control unit 19 executes drive control on the steered system actuator 17 such that the wheels 4 are steered to the target steered angle. FIG. 2 is a schematic sectional view that shows the operation mechanism 3 that is extracted from the steering system 1, and that shows a state where auxiliary portions 81 of a variable axial length mechanism 90 provided in a nut 41 are placed in restraint positions. FIG. 3 shows a state where the auxiliary portions 81 in FIG. 2 are placed in released positions Next, the operation mechanism 3, particularly, the steering direction detection unit 11, will be described in detail with reference to FIG. 2 and FIG. 3. Note that, in FIG. 2, the steering angle sensor 8 is not shown. The following description will be provided on the assumption that the wheels 4 (see FIG. 1) are steered to the right when the operation member 2 shown in FIG. 2 is rotated in the clockwise direction and the wheels 4 are steered to the left when the operation member 2 is rotated in the counterclockwise direction.

In the operation mechanism 3, the above-described housing 7 extends in the lateral direction in FIG. 2. In the housing 7, a round first end opening 20 is formed in a first end face in the lateral direction (right end face in FIG. 2), and a round second end opening 21 is formed in a second end face in the lateral direction (left end face in FIG. 2). The hollow portion of the housing 7 communicates with the outside of the housing 7 via the first end opening 20 and the second end opening 21.

In the housing 7, a portion that defines the first end opening 20 is a flange 22 that forms a slightly thick annular plate. On the inner periphery of the flange 22, a positioning protrusion 23 that protrudes radially inward is formed integrally with the flange 22 at an end portion that is farthest from the outside of the housing 7 (a leftmost portion in FIG. 2). In addition, on the inner periphery of the flange 22, an annular groove 24 that is recessed radially outward and that extends along the whole circumference of the flange 22 is formed at an end portion that is closest to the outside of the housing 7 (a rightmost portion in FIG. 2). An annular or C-shaped positioning ring 25 is fitted into the annular groove 24 from the radially inner side, An annular bearing 26 is coaxially fitted to the first end opening 20. The bearing 26 is positioned with respect to the housing 7 by being held by the positioning protrusion 23 and the positioning ring 25 from respective sides.

A holder 27 is accommodated in the hollow portion of the housing 7 in a region on the opposite side from the flange 22. The holder 27 has a hollow cylindrical shape that is coaxial with the housing 7. A first axial end of the holder 27 is closed, and a second axial end of the holder 27 is open. The holder 27 has a cylindrical peripheral wall 28 and a disc-shaped end wall 29, which are formed integrally with each other and which are located in the housing 7. The cylindrical peripheral wall 28 has an outside diameter that is substantially equal to the inside diameter of a portion of the housing 7, other than the flange 22. The end wall 29 is coupled to a first axial end of the cylindrical peripheral wall 28.

The holder 27 is fitted into the housing 7 through the second end opening 21. The end wall 29 of the holder 27 is located closer to the first end opening 20 (right side in FIG. 2) of the housing 7 than the other portion of the holder 27. By connecting the outer periphery of the cylindrical peripheral wall 28 to the inner periphery of the housing 7, the holder 27 is fixedly coupled to the housing 7, and becomes part of the housing 7. An opening 30 is defined by a second axial end of the cylindrical peripheral wall 28, the second axial end being on the opposite side of the cylindrical peripheral wall 28 from a portion to which the end wall 29 is coupled. The opening 30 is located at the same position in an axial direction J (the axial direction of the housing 7 and the holder 27) as the second end opening 21 of the housing 7. The hollow portion of the holder 27 communicates with the outside of the housing 7 via the opening 30 and the second end opening 21. A threaded portion 31 is formed in the inner periphery of the cylindrical peripheral wall 28, in a region around the opening 30.

A round shaft insertion hole 32 is formed at the circle center position of the end wall 29. The round shaft insertion hole 32 passes through the end wall 29 in the thickness direction (axial direction J). A portion of the end wall 29, which defines the shaft insertion hole 32, forms the inner periphery of the end wall 29. On the inner periphery of the end wall 29, a positioning protrusion 33 that protrudes radially inward is formed integrally with the end wall 29, at an end portion on the opening 30 side (left end portion in FIG. 2). An annular bearing 34 is coaxially fitted into the shaft insertion hole 32. The bearing 34 is positioned with respect to the housing 7 by bringing the positioning protrusion 33 into contact with the bearing 34 from the opening 30 side (left side in FIG. 2).

The steering direction detection unit 11 includes a threaded shaft 40, the nut 41, nut guides 42, stoppers 43 and a proximity detection sensor 92 that may function as a proximity detection unit. The threaded shaft 40 is a shaft member, and is coaxially coupled to the rotary shaft 6. The threaded shaft 40 and the rotary shaft 6 may be formed integrally with each other or may be formed so as to be detachable from each other. The threaded shaft 40 has a first thread forming portion 45, a first support portion 46, a second thread forming portion 47 and a second support portion 48, which are formed integrally with each other and arranged in this order from the rotary shaft 6 side.

A threaded portion 49 is formed on the outer periphery of the first thread forming portion 45. The outer periphery of the first support portion 46 is an even peripheral face. The first support portion 46 has substantially the same diameter as the first thread forming portion 45. The second thread forming portion 47 is slightly larger in diameter than the first support portion 46. Therefore, a step 51 is formed at an end portion of the second thread forming portion 47, the end portion being adjacent to the first support portion 46. A threaded portion 52 is formed on the outer periphery of the second thread forming portion 47. Note that the threaded portion 52 need not be formed all over the outer periphery of the second thread forming portion 47. In FIG. 2, no threaded portion 52 is formed in a region near the step 51, on the outer periphery of the second thread forming portion 47.

The outer periphery of the second support portion 48 is an even peripheral face. The second support portion 48 is slightly smaller in diameter than the second thread forming portion 47. Therefore, a step 53 is formed at an end portion of the second thread forming portion 47, the end portion being adjacent to the second support portion 48. The threaded shaft 40 is partially accommodated in the housing 7 in a state where the threaded shaft 40 is passed through the first end opening 20 and the second end opening 21 of the housing 7. In addition, the threaded shaft 40 is partially accommodated in the holder 27 in a state where the threaded shaft 40 is passed through the opening 30 and the shaft insertion hole 32 inside the housing 7. At this time, the threaded shaft 40 is coaxial with each of the housing 7 and the holder 27. Therefore, the axial direction of the threaded shaft 40 (rotary shaft 6) is the same as the above-described axial direction J.

In the threaded shaft 40, a major portion (portion other than an end portion on the first support portion 46 side) of the first thread forming portion 45 protrudes from the first end opening 20 to the outside of the housing 7. The threaded shaft 40 is connected to the rotary shaft 6. The first support portion 46 is fitted to the inner periphery of the above-described bearing 26. An annular positioning nut 54 is screwed to the threaded portion 49 of the first thread forming portion 45 from the radially outer side. The positioning nut 54 is in contact with the bearing 26 from the outer side of the housing 7. The positioning nut 54 may be regarded as part of the threaded shaft 40. The bearing 26 is positioned with respect to the threaded shaft 40 by being held by the positioning nut 54 and the step 51 from respective sides in the axial direction J.

In the threaded shaft 40, the second thread forming portion 47 is arranged in a region (referred to as "detection region") X between the flange 22 and the end wall 29 of the holder 27 in the hollow portion of the housing 7. The second support portion 48 is arranged in the hollow portion of the holder 27. An end portion of the second support portion 48, which is on the second thread forming portion 47 side, is fitted to the inner periphery of the above-described bearing 34. The bearing 34 is positioned with respect to the threaded shaft 40 by being held by the step 53 of the second thread forming portion 47, which is on the second support portion 48 side, and the positioning protrusion 33 of the end wall 29 of the holder 27 from respective sides in the axial direction J.

The threaded shaft 40 is rotatably supported by the housing (including the holder 27) at two portions in the axial direction J, at which the bearing 26 and the bearing 34 are positioned. Because the threaded shaft 40 is connected to the operation member 2 via the rotary shaft 6, the rotation direction (see the long dashed short dashed line in FIG. 2) of the threaded shaft 40 is the same as the steering direction of the operation member 2. That is, the threaded shaft 40 is rotatable in the steering direction of the operation member 2. The steering angle θ (see FIG. 1) of the operation member 2 is equal to the rotation angle of the threaded shaft 40.

The above-described reaction force generation unit 10 will be described before describing the nut 41, the nut guides 42, the stoppers 43 and the proximity detection sensor 92. The reaction force generation unit 10 is accommodated in the holder 27. The reaction force generation unit 10 includes an annular plug 61, an annular rubbing ring 62, an annular pressing ring 63 and a spring 64. The plug 61 surrounds the second support portion 48 of the threaded shaft 40 in a non-contact state. The rubbing ring 62 is fitted onto the second support portion 48, at a position closer to the end wall 29 than the plug 61. The pressing ring 63 is fitted onto the rubbing ring 62. The spring 64 is interposed between the plug 61 and the pressing ring 63 in a compressed state.

A threaded portion 65 is formed on the outer periphery of the plug 61, and the threaded portion 65 is screwed to the threaded portion 31 of the holder 27 from the radially inner side. An outer periphery 62A of the rubbing ring 62 and an inner periphery 63A of the pressing ring 63 both are conical surfaces that increase in diameter in a direction away from the plug 61 (rightward in FIG. 2), and are in surface contact with each other. The pressing ring 63 is urged by the spring 64 in a direction away from the plug 61, and presses the rubbing ring 62 radially inward, at its inner periphery 63A. Thus, as indicated by the wide line arrows, the rubbing ring 62 is reduced in diameter, and an inner periphery 62B of the rubbing ring 62 is pressed against the second support portion 48 of the threaded shaft 40. When the threaded shaft 40 is rotated due to a steering operation of the operation member 2, friction between the second support portion 48 and the inner periphery 62B of the rubbing ring 62 is applied to the operation member 2 as the above-described steering reaction force. When the plug 61 is screwed in toward the pressing ring 63, the urging force of the spring 64 increases. Accordingly, friction between the second support portion 48 and the inner periphery 62B of the rubbing ring 62 increases, and steering reaction force also increases. In this way, it is possible to adjust the steering reaction force on the basis of the screw-in amount of the plug 61.

The nut 41 has a cylindrical shape. In FIG. 2, for the sake of easy illustration, a portion corresponding to the cross section of the nut 41 is indicated by the positive-slope hatching. A threaded portion 55 is formed on the inner periphery of the nut 41. The nut 41 includes a main portion 80, auxiliary portions 81, urging members 82, and electromagnetic clutches 83 The main portion 80 forms the base (major part) of the nut 41. Each auxiliary portion 81 is movable relative to the main portion 80 in the axial direction. Each urging member 82 urges the corresponding auxiliary portion 81 in the axial direction. Each electromagnetic clutch 83 may function as a restraining device and a releasing device.

The main portion 80 has a cylindrical inner peripheral portion 84, a cylindrical outer peripheral portion 85 and an annular coupling portion 86 that are formed integrally with each other. The inner peripheral portion 84 defines the inner periphery of the nut 41. The outer peripheral portion 85 is arranged coaxially with the inner peripheral portion 84, and surrounds the inner peripheral portion 84 in a non-contact state. The coupling portion 86 extends in the radial direction and connects substantially axial center portions of the inner peripheral portion 84 and outer peripheral portion 85 to each other. In the thus-configured main portion 80, the cross section of a one-side portion with respect to the shaft center (see long dashed short dashed line) of the nut 41 has an I-shape, and the overall sectional shape of the main portion 80 is a shape formed by connecting two shapes of alphabet "E" back to back.

The above-described threaded portion 55 is formed on the inner periphery of the inner peripheral portion 84. An annular recess 87 is formed in each of both axial end faces of the coupling portion 86. Each annular recess 87 is annular when viewed from the axial direction, and is a recess that surrounds the inner peripheral portion 84 at the boundary between the coupling portion 86 and the inner peripheral portion 84.

The annular recesses 87 at respective axial sides of the coupling portion 86 do not communicate with each other.

Retaining ribs 88 that extend radially inward are formed integrally with respective axial ends of the inner periphery of the outer peripheral portion 85. The retaining rib 88 formed at each of the axial ends may be in a continuous annular shape or may be in an incomplete annular shape with interruption in the circumferential direction. Round insertion holes 56 are formed in the outer peripheral portion 85. The insertion holes 56 pass through the outer peripheral portion 85 (that is, the nut 41) in the axial direction (thickness direction). A single or a plurality of (two in the present embodiment) the insertion holes 56 is formed. When a plurality of the insertion holes 56 is formed, the insertion holes 56 are formed at equal intervals in the circumferential direction.

Each auxiliary portion 81 has an annular shape, and the auxiliary portions 81 (two in total) are provided on respective axial sides of the coupling portion 86. Each auxiliary portion 81 is fitted onto the inner peripheral portion 84. In addition, each auxiliary portion 81 is fitted to the inner periphery of the outer peripheral portion 85. Each auxiliary portion 81 is arranged coaxially with the inner peripheral portion 84 and the outer peripheral portion 85, at a position between the inner peripheral portion 84 and the outer peripheral portion 85. That is, each auxiliary portion 81 is accommodated in the main portion 80. In this state, each auxiliary portion 81 is loosely fitted between the inner peripheral portion 84 and the outer peripheral portion 85, and is slidable in the axial direction within the range between the coupling portion 86 and the retaining rib 88 on the same side as the corresponding auxiliary portion 81 in the axial direction. More specifically, each auxiliary portion 81 is slidable between a restraint position (see FIG. 2) in which the auxiliary portion 81 is in contact with the coupling portion 86 and a released position (see FIG. 3) in which the auxiliary portion 81 is moved away from the coupling portion 86 and is in contact with the retaining rib 88 on the same side as the auxiliary portion 81 in the axial direction.

Each auxiliary portion 81 placed in the released position is in contact with the corresponding retaining rib 88. As a result, the auxiliary portion 81 is not able to fall off from a position between the inner peripheral portion 84 and the outer peripheral portion 85 (see FIG. 3). In each auxiliary portion 81, an annular recess 89 is formed at such a position as to axially face the annular recess 87 on the same side in the axial direction. Each annular recess 89 has an annular shape along the inner peripheral edge of the auxiliary portion 81 when viewed from the axial direction, and is recessed in a direction away from the annular recess 87 on the same side in the axial direction.

Each urging member 82 is, for example, a coil spring, and one urging member 82 is provided on each of both axial sides of the coupling portion 86. Each urging member 82 is fitted onto the inner peripheral portion 84. From among the two urging members 82 in total, one of the urging members 82 is arranged on one axial side (left side in FIG. 2) of the coupling portion 86 in a compressed state, at a position between the annular recess 89 of the auxiliary portion 81 and the annular recess 87 on the one axial side. The other urging member 82 is arranged on the other axial side (right side in FIG. 2) of the coupling portion 86 in a compressed state, at a position between the annular recess 89 of the auxiliary portion 81 and the annular recess 87 on the other axial side. Each urging member 82 urges the corresponding auxiliary portion 81 such that the auxiliary portion 81 moves away from the coupling portion 86 of the main portion 80.

Each electromagnetic clutch 83 includes a first clutch portion 83A and a second clutch portion 83B. The first clutch portion 83A is provided on a face of the coupling portion 86, which faces a corresponding one of the auxiliary portions 81. The second clutch portion 83B is provided on a face of each auxiliary portion 81, which faces the coupling portion 86. Each electromagnetic clutch 83 is electrically connected to the above-described control unit 19 (see FIG. 1), and the control unit 19 controls on/off states of each electromagnetic clutch 83.

In the present embodiment, as shown in FIG. 2, each electromagnetic clutch 83 is engaged when it is turned on, and each first clutch portion 83A of the coupling portion 86 (main portion 80) is in close contact with the second clutch portion 83B of the corresponding auxiliary portion 81. Therefore, each electromagnetic clutch 83 in an on state places the corresponding auxiliary portion 81 in the above-described restraint position against the urging force of the urging member 82, and restrains the corresponding auxiliary portion 81 to the main portion 80. On the other hand, each electromagnetic clutch 83 is disengaged when it is turned off, and each first clutch portion 83A is not in close contact with the second clutch portion 83B of the corresponding auxiliary portion 81. Therefore, when each electromagnetic clutch 83 is turned off, the electromagnetic clutch 83 releases the corresponding auxiliary portion 81 from restraint to the main portion 80. As a result, each auxiliary portion 81 moves to the released position (see FIG. 3) by the urging force of the corresponding urging member 82.

An assembly of the main portion 80, the auxiliary portions 81, the urging members 82 and the electromagnetic clutches 83, that is, the nut 41 as a whole, constitutes the variable axial length mechanism 90. A specific function of the variable axial length mechanism 90 will be described below. The nut 41 is arranged in the above-described detection region X, and is fitted onto the second thread forming portion 47 of the threaded shaft 40. At this time, the threaded portion 55 of the nut 41 is screwed to the threaded portion 52 of the second thread forming portion 47. That is, the nut 41 is screwed to the threaded shaft 40, and is coaxial with the threaded shaft 40. Therefore, the axial direction of the nut 41 coincides with the above-described axial direction J.

The nut guides 42 are shaft members, and the number of the nut guides 42 is the same as the number (two, in the present embodiment) of the insertion holes 56 of the nut 41. The nut guides 42 are arranged parallel to the second thread forming portion 47 of the threaded shaft 40 in the detection region X, and are passed through the respective insertion holes 56 of the nut 41. That is, each nut guide 42 (more specifically, a portion between both ends) passes through the nut 41 in a corresponding one of the insertion holes 56.

The stoppers 43 each are a plate-like member that is thin in the axial direction J and extends along the radial direction of the housing 7, and are fixed to the inner periphery of the housing 7 in the detection region X. The stoppers 43 extend from the inner periphery toward the second thread forming portion 47 of the threaded shaft 40. The stoppers 43 are provided on respective axial sides of the nut 41. Note that, in FIG. 2, for the sake of easy illustration, a portion that corresponds to the cross section of each stopper 43 is indicated by the negative-slope hatching.

In FIG. 2, the two stoppers 43 located at the same position in the axial direction J (the upper and lower two stoppers 43 on respective sides of the nut 41 in the direction normal to the axial direction J) are integrated with each other as part of an annular member that surrounds the second thread forming portion 47 in a non-contact state. Therefore, the thin long plate-like and annular stoppers 43 are provided (two in total) on respective axial sides of the two insertion holes 56 of the nut 41. An annular protruding portion 91 that protrudes toward the nut 41 is formed integrally with the inner peripheral portion of each stopper 43. Each protruding portion 91 is larger in diameter than the inner peripheral portion 84 of the nut 41 and is smaller in diameter than the outer peripheral portion 85.

On the protruding portion 91 of each stopper 43, the above-described proximity detection sensor 92 is provided at a position that faces the auxiliary portion 81 on the same side in the axial direction J. In the present embodiment, each proximity detection sensor 92 is a switch that is normally off and is turned on when an external object (the auxiliary portion 81, in the present embodiment) contacts the proximity detection sensor 92. Each proximity detection sensor 92 may be turned on when an external object is in proximity to the proximity detection sensor 92. That is, each proximity detection sensor 92 is a sensor that detects the fact that the proximity detection sensor 92 is in contact with an external object or the fact that the proximity detection sensor 92 is in proximity to an external object. The proximity detection sensor 92 on each stopper 43 faces the auxiliary portion 81 on the same side in the axial direction J from the outer side of the nut 41 in the axial direction J. Therefore, each auxiliary portion 81 is urged by the corresponding urging member 82 so as to move away from the main portion 80 (coupling portion 86) toward the proximity detection sensor 92 (stopper 43) on the same side in the axial direction J.

Each nut guide 42 passed through the corresponding insertion hole 56 of the nut 41 is fixed to the stoppers 43 that are located on respective sides of the insertion hole 56 in the axial direction J. Therefore, the stoppers 43 are provided at respective ends of the nut guide 42 in the longitudinal direction (which coincides with the axial direction J), and retain one end and the other end of each nut guide 42 in the longitudinal direction. As a result, the state where each nut guide 42 is passed through the corresponding insertion hole 56 of the nut 41 is maintained.

Each nut guide 42 may be passed through the corresponding insertion hole 56 with a slight play. As shown in FIG. 2, when the user steers the operation member 2 to rotate the operation member 2 in the clockwise direction or the counter clockwise direction, the rotary shaft 6 and the threaded shaft 40 also rotate together with the operation member 2. At this time, the nut 41 screwed to the threaded shaft 40 attempts to rotate together with the threaded shaft 40. However, the nut 41 is not able to rotate because the nut guides 42 are passed through the respective insertion holes 56 of the nut 41 and the nut 41 slides along the nut guides 42 (in other words, the axial direction J of the threaded shaft 40) instead of rotating. That is, the nut guides 42 cause the nut 41 to move in the axial direction J of the threaded shaft 40 as the threaded shaft 40 rotates.

For example, when the user rotates the operation member 2 (in other words, the threaded shaft 40) in the clockwise direction in FIG. 2, the nut 41 slides along the nut guides 42 in a direction toward the operation member 2 (rightward in FIG. 2). When the operation member 2 is continuously rotated in the same direction and, finally, the protruding portion 91 of the stopper 43 which is closest to the operation member 2 (on the right side in FIG. 2) enters a space between the inner peripheral portion 84 and outer peripheral portion 85 of the nut 41 from the right side. The right-side auxiliary portion 81 contacts (comes close to) the proximity detection sensor 92 provided on the corresponding protruding portion 91, and the proximity detection sensor 92 is turned on. Thus, the nut 41 is not able to slide any more, and the operation member 2 is not allowed to be rotated in the same direction (clockwise direction) any more. That is, on the right side of the nut 41 shown in FIG. 2, the proximity detection sensor 92 detects the fact that the auxiliary portion 81 of the nut 41 contacts (comes close to) the protruding portion 91 of the stopper 43, and the stopper 43 prevents movement of the nut 41 in the axial direction J (rightward in FIG. 2) beyond a predetermined position at which the nut 41 contacts the stopper 43.

On the other hand, when the user rotates the operation member 2 in the counterclockwise direction in FIG. 2, the nut 41 slides in a direction away from the operation member 2 (leftward in FIG. 2) along the nut guides 42. When the operation member 2 is continuously rotated in the same direction and, finally, the protruding portion 91 of the stopper 43 which is farthest from the operation member 2 (on the left side in FIG. 2) enters a space between the inner peripheral portion 84 and outer peripheral portion 85 of the nut 41 from the left side. The left-side auxiliary portion 81 contacts (comes close to) the proximity detection sensor 92 provided on the corresponding protruding portion 91, and the proximity detection sensor 92 is turned on. Thus, the nut 41 is not able to slide any more, and the operation member 2 is not allowed to be rotated in the same direction (counterclockwise direction) any more. That is, on the left side of the nut 41 shown in FIG. 2, the proximity detection sensor 92 detects the fact that the auxiliary portion 81 of the nut 41 contacts (comes close to) the protruding portion 91 of the stopper 43. Thus, the stopper 43 prevents movement of the nut 41 in the axial direction J (leftward in FIG. 2) beyond a predetermined position at which the nut 41 contacts the stopper 43.

The information that the proximity detection sensor 92 is turned on is input into the control unit 19 (see FIG. 1). When the right-side proximity detection sensor 92 shown in FIG. 2 is turned on, the control unit 19 determines that the steering direction of the operation member 2 is the clockwise direction in FIG. 2. When the left-side proximity detection sensor 92 shown in FIG. 2 is turned on, the control unit 19 determines that the steering direction of the operation member 2 is the counterclockwise direction in FIG. 2. In this way, not only the steering angle θ (see FIG. 1) detected by the steering angle sensor 8 but also the information that one of the proximity detection sensors 92 is turned on (the steering direction of the operation member 2) is input into the control unit 19.

As shown in FIG. 1, for example, when a malfunction occurs in the steering angle sensor 8, a detection result (steering angle θ) from the steering angle sensor 8 is not input into the control unit 19. In this case, the control unit 19 acquires the steering direction in which the operation member 2 is operated by the user on the basis of the information received from one of the proximity detection sensors 92 of the steering direction detection unit 11 (information that one of the proximity detection sensors 92 is turned on). When the right-side proximity detection sensor 92 shown in FIG. 2 is turned on (when the steering direction of the operation member 2 is the clockwise direction), the control unit 19 executes drive control on the steered system actuator 17 such that the wheels 4 are steered to the right at a predetermined speed and by a predetermined angle during a period in which the proximity detection sensor 92 is on or within a predetermined period from when the proximity detection sensor 92 is turned on (see FIG. 1). On the other hand, when the left-side proximity detection sensor 92 shown in FIG. 2 is turned on (when the steering direction of the operation member 2 is the counterclockwise direction), the control unit 19 executes drive control on the steered system actuator 17 such that the wheels 4 are steered to the left at a predetermined speed and by a predetermined angle during a period in which the proximity detection sensor 92 is on or within a predetermined period from when the proximity detection sensor 92 is turned on.

As described above, in the steer-by-wire steering system 1, it is possible not only to detect the steering angle θ of the operation member 2 with the use of the steering angle sensor 8 but also to detect the steering direction of the operation member 2 with the use of the steering direction detection unit 11. Therefore, even if a malfunction occurs in the steering angle sensor 8, the steered mechanism 5 is able to steer the wheels 4 on the basis of the steering direction detected by the steering direction detection unit 11 that serves as a fail-safe mechanism. That is, the steering system 1 allows at least continuation of steering even if a malfunction occurs in the steering angle sensor 8, although the accuracy is lower than that when the steering angle sensor 8 is operating normally.

The steering direction detection unit 11 that detects only the steering direction has a simpler configuration than that of the steering angle sensor 8 that detects the steering angle θ (both the steering direction and steering amount) of the operation member 2. Specifically, as shown in FIG. 2, the steering direction detection unit 11 has a low-cost and simple configuration that includes the threaded shaft 40, the nut 41, the nut guides 42, the stoppers 43 and the proximity detection sensors 92. The steering direction detection unit 11 is able to detect the steering direction of the operation member 2 on the basis of the fact that the nut 41 moves along the axial direction J of the threaded shaft 40 in accordance with a steering operation of the operation member 2 (rotation of the threaded shaft 40) and then comes close to the stopper 43 (more specifically, the proximity detection sensor 92). By using the thus-configured steering direction detection unit 11, it is possible to suppress increases in the number of components and the cost in comparison with the case where the steering angle sensor 8 is additionally provided instead of the steering direction detection unit 11.

Figure 4:
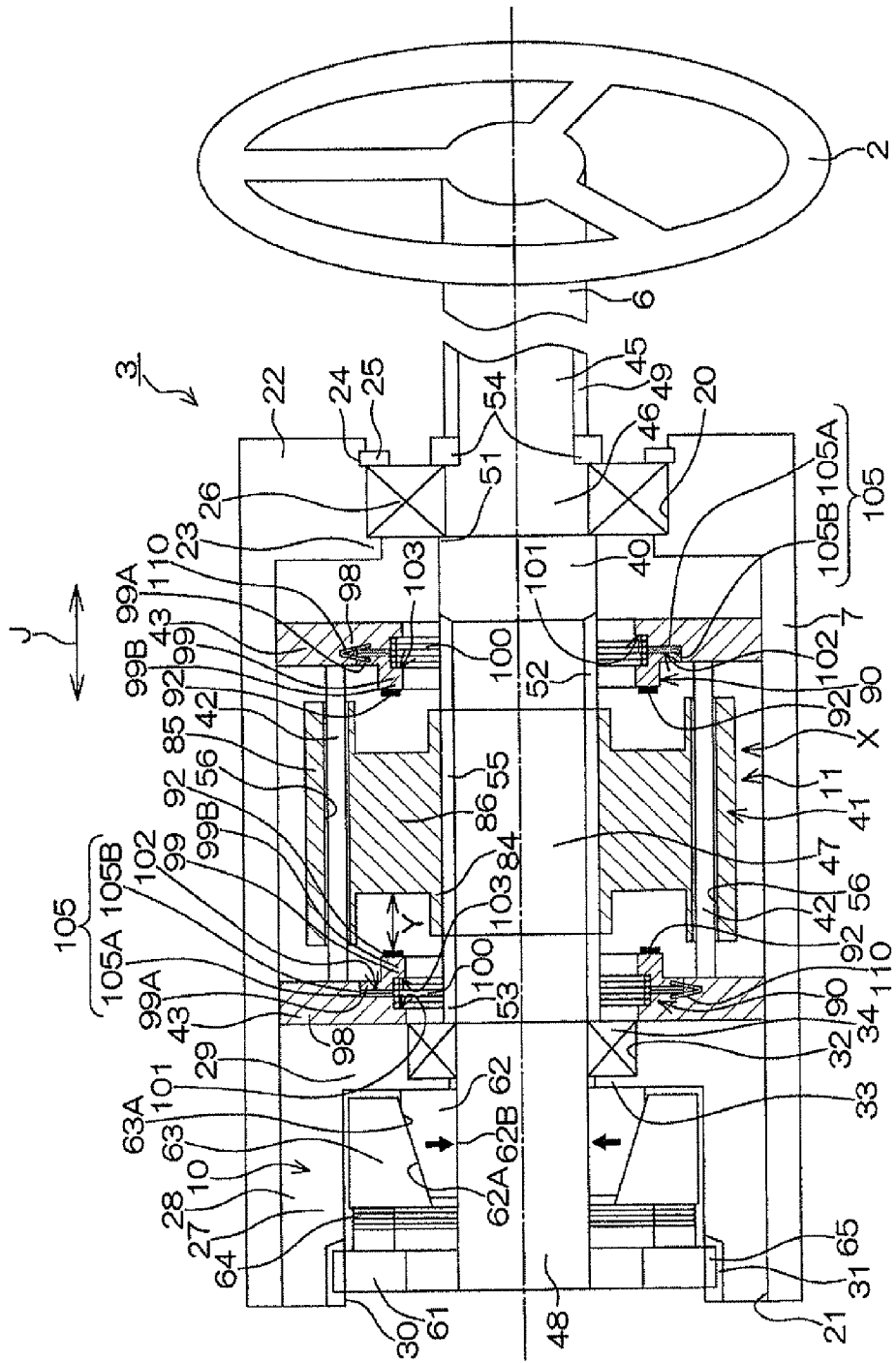
FIG. 4 shows a modified example of the operation mechanism in FIG. 2, and shows a state where auxiliary portions of variable axial length mechanisms provided in respective stoppers are placed in restraint positions.
Figure 5:
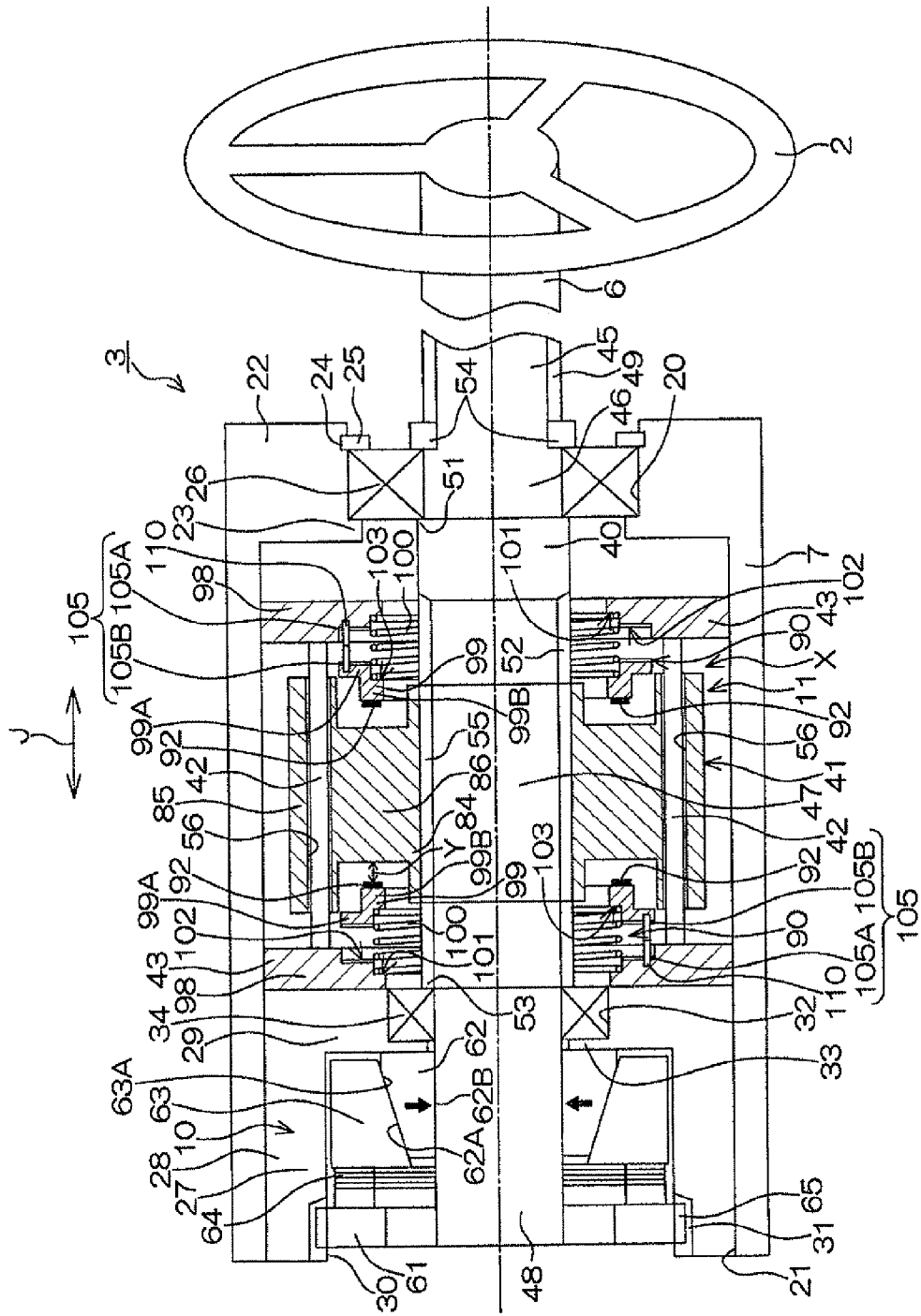
FIG. 5 shows a state where the auxiliary portions in FIG. 4 are placed in released positions.

That is, the configuration that allows continuation of steering even if a malfunction occurs in the steering angle sensor 8 is implemented without increases in the number of components and the cost, and it is possible to ensure the redundancy of the steering system 1. Particularly, even when the steering direction detection unit 11 is added to the existing operation mechanism 3, it is possible to avoid a significant design change in the operation mechanism 3. Therefore, it is possible to reliably avoid increases in the number of components and the cost. However, in the above-described case, the wheels 4 are started to be steered by the steered system actuator 17 after the operation member 2 is rotated to the steering end in one of the clockwise direction and the counterclockwise direction. Therefore, there may be a time lag from when rotation of the operation member 2 is started until when steering of the wheels 4 is started. FIG. 2 shows a state where the operation member 2 is placed in the above-described steering neutral position (FIG. 3 to FIG. 5 also show the same state). When each auxiliary portion 81 of the nut 41 is placed in the restraint position, there is a clearance Y in the axial direction J between the auxiliary portion 81 and the proximity detection sensor 92 on the same side in the axial direction J. The clearance Y corresponds to a displacement (stroke) of the nut 41 at the time when the operation member 2 is rotated from the steering neutral state in one direction. Therefore, when the operation member 2 is rotated from the steering neutral state, the wheels 4 are not started to be steered until the nut 41 moves over a distance corresponding to the clearance Y. Moreover, for example, when the operation member 2 is returned, that is, when the operation member 2 is rotated to the steering end in the clockwise direction and then the operation member 2 is rotated in the counterclockwise direction, steering of the wheels 4 is not started until the nut 41 moves over a distance obtained by doubling the clearance Y after the operation member 2 is started to be returned. Therefore, the above-described time lag increases.

In order to solve the above-described problem, the aforementioned variable axial length mechanism 90 functions. More specifically, in normal times when there is no malfunction in the steering angle sensor 8, the electromagnetic clutches 83 are on and are engaged, and the auxiliary portions 81 of the nut 41 are placed in the restraint positions shown in FIG. 2. However, as described above, when a malfunction occurs in the steering angle sensor 8, the control unit 19 turns off the electromagnetic clutches 83 in response to the fact that the result (steering angle θ) detected by the steering angle sensor 8 is not input into the control unit 19. Each auxiliary portion 81, which has been placed in the restraint position, is released from a restraint to the main portion 80 by the corresponding electromagnetic clutch 83. As a result, as shown in FIG. 3, each auxiliary portion 81 moves from the main portion 80 toward the stopper 43 on the same side in the axial direction J by the urging force of the urging member 82, and reaches the above-described released position. Thus, the clearance Y (in the axial direction J) between the auxiliary portion 81 (nut 41) and the proximity detection sensor 92 (stopper 43) on the same side in the axial direction J becomes smaller than that when each auxiliary portion 81 is placed in the restraint position (see FIG. 2). That is, the variable axial length mechanism 90 reduces the clearance Y in response to the fact that a malfunction occurs in the steering angle sensor 8. By so doing, a period of time from when steering operation of the operation member 2 is started until when the nut 41 comes close to the stopper 43 (in other words, the time required to detect the steering direction) is reduced. Accordingly, it is possible to improve the response of the steered operation of the wheels 4 to the steering operation of the operation member 2. As a result, it is possible to improve the operability of the operation member 2 at the time of, for example, returning the operation member 2.

The nut 41 may be provided with lock mechanisms 93 that are used to fix the respective auxiliary portions 81 in the released positions. Each lock mechanism 93 is provided for a corresponding one of the auxiliary portions 81. The lock mechanisms 93 are shown only in FIG. 3. Each lock mechanism 93 has an inner recess 94, an outer recess 95, an engaging portion 96 and a spring member 97. The inner recess 94 is a recess formed in the outer periphery of the corresponding auxiliary portion 81. The outer recess 95 is a recess formed in the inner periphery of the outer peripheral portion 85 of the main portion 80. The outer recess 95 is formed at a position that faces the inner recess 94 from the radially outer side when the corresponding auxiliary portion 81 is placed in the released position. The engaging portion 96 has a block shape and is accommodated in the corresponding inner recess 94. The spring member 97 is accommodated in the corresponding inner recess 94, and is compressed between the bottom of the inner recess 94 and the engaging portion 96. When each auxiliary portion 81 moves to the released position, the inner recess 94 of each auxiliary portion 81 and the corresponding outer recess 95 in the main portion 80 face each other in the radial direction, and the engaging portion 96 of the inner recess 94 is fitted into the outer recess 95 by the urging force of the spring member 97. As a result, each auxiliary portion 81 becomes immovable in the axial direction J, and each auxiliary portion 81 is fixed in the released position.

When the variable axial length mechanism 90 operates due to occurrence of a malfunction in the steering angle sensor 8 and then the auxiliary portions 81 are placed in the released positions, the operation (rotation) stroke of the operation member 2 becomes smaller than that when the auxiliary portions 81 are placed in the restraint positions (see FIG. 2), In this state, the user drives the vehicle to a garage, or the like, while steering the operation member 2. At the time of a repair of the steering angle sensor 8 at the garage, locking of the auxiliary portions 81 by the lock mechanisms 93 is released, and the auxiliary portions 81 are fixed in the restraint positions again by turning on the electromagnetic clutches 83 (see FIG. 2).

The invention is not limited to the above-described embodiment and various modifications may be made within the scope of the appended claims. FIG. 4 shows a modified example of the operation mechanism 3 in FIG. 2, and shows a state where auxiliary portions 99 of variable axial length mechanisms 90 provided in respective stoppers 43 are placed in restraint positions. FIG. 5 shows a state where the auxiliary portions 99 shown in FIG. 4 are placed in released positions. In FIG. 4 and FIG. 5, the same components as those described with reference to FIG. 1 to FIG. 3 are denoted by the same reference numerals in FIG. 1 to FIG. 3, and the description thereof is omitted.

For example, the variable axial length mechanism 90 may be provided in each of the stoppers 43 as shown in FIG. 4 and FIG. 5 instead of in the nut 41. In the modified example shown in FIG. 4, the nut 41 has substantially the same shape as the main portion 80 (see FIG. 2) according to the above-described embodiment, and includes the inner peripheral portion 84, the outer peripheral portion 85 and the coupling portion 86. However, no retaining ribs 88 (see FIG. 2 and FIG. 3) are formed on the inner periphery of the outer peripheral portion 85, and the inner periphery of the outer peripheral portion 85 has a constant inside diameter over substantially the entire region.

Each stopper 43 according to the modified example includes a main portion 98, the auxiliary portion 99, an urging member 100, an electromagnetic clutch 105, a hinge lever 110 and the above-described proximity detection sensor 92. The main portion 98 forms the base (major part) of the stopper 43. The auxiliary portion 99 is movable in the axial direction J relative to the main portion 98. The urging member 100 urges the auxiliary portion 99 in the axial direction J. The electromagnetic clutch 105 may function as a restraining device and a releasing device. An assembly of the main portion 98, the auxiliary portion 99, the urging member 100, the hinge lever 110 and the electromagnetic clutch 105 constitutes each variable axial length mechanism 90.

Each main portion 98 has a thin long plate-like and annular shape having substantially the same shape as the stopper 43. A first recess 101 and a second recess 102 are contiguously formed in a face of each main portion 98, which faces the nut 41. When viewed from the axial direction J, the first recess 101 has an annular shape along the inner peripheral edge of the main portion 98, the second recess 102 has an annular shape along the outer periphery of the first recess 101, and the first recess 101 is deeper than the second recess 102.

Each auxiliary portion 99 has an annular shape, and includes an outer peripheral portion 99A and an inner peripheral portion 99B. The outer peripheral portion 99A has an annular shape that is smaller in diameter than the inner periphery of the outer peripheral portion 85 of the nut 41 and that has such a size that the outer periphery 99A is just fitted into the second recess 102. The inner peripheral portion 9913 has an annular shape that is smaller in diameter than the outer peripheral portion 99A and the outer peripheral portion 85 of the nut 41, and protrudes from the inner peripheral edge of the outer peripheral portion 99A in the axial direction J. The outer peripheral portion 99A is fitted into the second recess 102 and, therefore, the auxiliary portion 99 is partially accommodated in the main portion 98, and the inner peripheral portion 9913 protrudes toward the nut 41. The proximity detection sensor 92 is provided on an end face of each auxiliary portion 99, which is on the nut 41 side. An annular recess 103 is formed in each auxiliary portion 99 at a position that faces the first recess 101 in the axial direction J. The annular recess 103 is recessed toward the nut 41 along the inner peripheral edge of the auxiliary portion 99.

Each hinge lever 110 is a rod member, and is able to freely bend using a middle portion (substantially the center) in its longitudinal direction as a bending point. At least one hinge lever 110 is provided in each stopper 43. In each hinge lever 110, one end in the longitudinal direction is coupled to the main portion 98, and the other end in the longitudinal direction is coupled to the auxiliary portion 99. The main portion 98 and the auxiliary portion 99 are coupled to each other by the hinge lever 110. Each auxiliary portion 99 is movable relative to the main portion 98 within a range in which the hinge lever 110 bends or extends linearly (see FIG. 4 and FIG. 5).

Each urging member 100 includes a coil spring. Each urging member 100 is accommodated in the first recess 101 and the annular recess 103 of the corresponding stopper 43, and is compressed between the main portion 98 and the auxiliary portion 99 while surrounding the second thread forming portion 47 of the threaded shaft 40 in a non-contact state. Thus, in each stopper 43, the urging member 100 urges the auxiliary portion 99 such that the auxiliary portion 99 moves away from the main portion 98 toward the nut 41 in the axial direction J.

Each electromagnetic clutch 105 includes a first clutch portion 105A and a second clutch portion 105B. The first clutch portion 105A is provided on a face (the bottom face of the second recess 102) of the main portion 98, which faces the auxiliary portion 99. The second clutch portion 105B is provided on a face (a portion radially outward of the annular recess 103) of the auxiliary portion 99, which faces the main portion 98. Each electromagnetic clutch 105, as well as the above-described electromagnetic clutch 83 (see FIG. 2 and FIG. 3), is electrically connected to the above-described control unit 19 (see FIG. 1), and is turned on or off by the control unit 19. Each electromagnetic clutch 105, as well as the electromagnetic clutch 83, is engaged when it is turned on, and is disengaged when it is turned off.

In each stopper 43, when the electromagnetic clutch 105 is on, the first clutch portion 105A of the main portion 98 is in close contact with the second clutch portion 105B of the auxiliary portion 99. Therefore, the electromagnetic clutch 105 in an on state restrains the auxiliary portion 99 to the main portion 80 against the urging force of the urging member 100. The position of the auxiliary portion 99 at this time is referred to as a restraint position. At this time, each hinge lever 110 is bent in a V-shape (see FIG. 4).

On the other hand, when the electromagnetic clutch 105 is turned off, the first clutch portion 105A is not in close contact with the second clutch portion 105E of the auxiliary portion 99. Therefore, when each electromagnetic clutch 105 is turned off, each electromagnetic clutch 105 releases the corresponding auxiliary portion 99 from a restraint to the main portion 98. Thus, each auxiliary portion 99 is moved toward the nut 41 by the urging force of the urging member 100. When the hinge lever 110 extends linearly, the auxiliary portion 99 stops moving (see FIG. 5). The position of the auxiliary portion 99 at this time is referred to as a released position. The hinge levers 110 need not be used. In this case, the position of each auxiliary portion 99 at the time when the auxiliary portion 99 has moved toward the nut 41 until the urging member 100 extends to a natural length is referred to as a released position.

In normal times when there is no malfunction in the steering angle sensor 8, the electromagnetic clutches 105 are on and engaged. In normal times, the auxiliary portion 99 of each stopper 43 is placed in the restraint position shown in FIG. 4. However, when a malfunction occurs in the steering angle sensor 8, the control unit 19 turns off and disengages the electromagnetic clutches 105. Then, each auxiliary portion 99, which has been placed in the restraint position, is released from a restraint to the main portion 98 by the corresponding electromagnetic clutch 105. Thus, as shown in FIG. 5, each auxiliary portion 99 moves away from the corresponding main portion 98 toward the nut 41 by the urging force of the urging member 100, and reaches the above-described released position. As a result, the clearance Y in the axial direction J between the nut 41 (coupling portion 86) and the proximity detection sensor 92 (stopper 43) becomes smaller than that in the case (see FIG. 4) where each auxiliary portion 99 is placed in the restraint position. That is, in the modified example as well, when a malfunction occurs in the steering angle sensor 8, each variable axial length mechanism 90 reduces the clearance Y in response to occurrence of a malfunction in the steering angle sensor 8.

In the modified example as well, the above-described lock mechanisms 93 (see FIG. 3) may be provided (not shown). In this case, the lock mechanism 93 is provided in each stopper 43, and each auxiliary portion 99 is fixed in the released position by the lock mechanism 93. In addition, in the above-described embodiment, because the stoppers 43 are provided at respective ends of each nut guide 42 in the longitudinal direction, the steering direction detection unit 11 is able to detect each of the steering directions, that is, the clockwise direction and counterclockwise direction of the operation member 2 (see FIG. 2). However, if it is necessary to detect only one of the steering directions, the stopper 43 need to be provided at only the first end portion or the second end portion of each nut guide 42 in the longitudinal direction.

A strain sensor (strain gauge), a pressure-sensitive sensor formed of a piezoelectric element, or the like, or a proximity sensor may be used as the proximity detection sensor 92 instead of the switch. In addition, a rubber block, or the like may be used as the above-described urging members 82, 100, instead of the coil spring. In addition, a mechanical clutch having an engaging portion and an engaged portion that are engaged with each other or disengaged from each other when the clutch is turned on or off may be used instead of the electromagnetic clutches 83, 105.

What is claimed is:

1. A steering system, comprising:
an operation mechanism that includes an operation member used to perform a steering operation; and
a steered mechanism that is not mechanically coupled to the operation mechanism, and that steers a wheel based on the steering operation of the operation member, wherein
the operation mechanism includes a steering angle sensor that detects a steering angle of the operation member and a steering direction detection unit that detects a steering direction of the operation member, and
the steering direction detection unit includes a threaded shaft that is rotatable in the steering direction of the operation member, a nut that is screwed to the threaded shaft, a nut guide that is arranged parallel to the threaded shaft and that causes the nut to move in an axial direction of the threaded shaft in accordance with rotation of the threaded shaft, a stopper that is provided at at least one end of the nut guide in a longitudinal direction of the nut guide and that prevents movement of the nut in the axial direction beyond a predetermined position, a proximity detection unit that detects a fact that the nut is in proximity to the stopper, the proximity detection unit being provided at the stopper, and a variable axial length mechanism that reduces a clearance in the axial direction between the nut and the stopper in response to occurrence of a malfunction in the steering angle sensor.

2. The steering system according to claim 1, wherein:
the variable axial length mechanism is provided in the nut; and
the variable axial length mechanism includes a main portion, two auxiliary portions that are accommodated in the main portion, urging members that urge the auxiliary portions such that the auxiliary portions move away from the main portion toward the corresponding stoppers in the axial direction, a restraining device that restrains the auxiliary portions to the main portion against urging force of the urging members, and a releasing device that releases the auxiliary portions from a restraint by the restraining device in response to occurrence of a malfunction in the steering angle sensor.

3. The steering system according to claim 1, wherein the variable axial length mechanism is provided in each of the stoppers, and each of the variable axial length mechanisms includes a main portion, an auxiliary portion that is accommodated in the main portion, an urging member that urges the auxiliary portion such that the auxiliary portion moves away from the main portion toward the nut in the axial direction, a restraining device that restrains the auxiliary portion to the main portion against urging force of the urging member, and a releasing device that releases the auxiliary portion from a restraint by the restraining device in response to occurrence of a malfunction in the steering angle sensor.

* * * * *